United States Patent
Religa et al.

(10) Patent No.: US 12,307,202 B2
(45) Date of Patent: May 20, 2025

(54) AUTOMATIC WRITING STYLE DETECTION AND REWRITING

(71) Applicant: Microsoft Technology Licensing, LLC, Redmond, WA (US)

(72) Inventors: Tomasz Lukasz Religa, Seattle, WA (US); Warren Aldred, Redmond, WA (US); Si-Qing Chen, Bellevue, WA (US); Zhang Li, Sammamish, WA (US); Jesse Alexander Freitas, Seattle, WA (US); Tao Ge, Beijing (CN); Huitian Jiao, Snoqualmie, WA (US); Max Wang, Seattle, WA (US); Xun Wang, Amherst, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 17/890,714

(22) Filed: Aug. 18, 2022

(65) Prior Publication Data
US 2024/0061999 A1 Feb. 22, 2024

(51) Int. Cl.
*G06F 40/253* (2020.01)
*G06F 40/166* (2020.01)

(52) U.S. Cl.
CPC .......... *G06F 40/253* (2020.01); *G06F 40/166* (2020.01)

(58) Field of Classification Search
CPC ..................................................... G06Q 10/10
See application file for complete search history.

(56) References Cited

U.S. PATENT DOCUMENTS

| 10,558,758 | B2 | 2/2020 | Mehrotra |
| 10,949,619 | B1 | 3/2021 | Arsanjani et al. |
| 11,194,958 | B2 * | 12/2021 | Maneriker ............. G06N 20/00 |
| 11,755,636 | B2 * | 9/2023 | Oberoi .................. G06F 16/345 |
| | | | 707/736 |
| 2012/0245934 | A1 | 9/2012 | Talwar et al. |
| 2017/0185591 | A1 | 6/2017 | Tetreault et al. |

(Continued)

OTHER PUBLICATIONS

Nath, Sukanya. "Style Change Detection" Thesis, Department of Computer Science, University of Neuchâtel, Oct. 2021 (Year: 2021).*

(Continued)

*Primary Examiner* — Jesse S Pullias
(74) *Attorney, Agent, or Firm* — Novo TechIP International PLLC

(57) ABSTRACT

A data processing system obtains source textual content associated with a first writing style and target textual content associated with a second writing style and provides the source textual content as an input to a first machine learning model which analyzes the source content to determine the first writing style of the first textual content. The system provides an indication of the first writing style and the target textual content as an input to a second machine learning model which analyzes the target textual content and rewrites the target textual content according to the first writing style to output updated target textual content rewritten according to the first writing style. Some implementations utilize a single model trained to receive the source textual content, the target textual content, to determine the writing style of the source textual content and rewrite the target textual content according to the first writing style.

20 Claims, 12 Drawing Sheets

(56) References Cited

U.S. PATENT DOCUMENTS

| | | | |
|---|---|---|---|
| 2018/0267950 A1* | 9/2018 | de Mello Brandao | G06F 40/30 |
| 2018/0278561 A1 | 9/2018 | Carnevale et al. | |
| 2019/0121842 A1 | 4/2019 | Catalano et al. | |
| 2020/0053035 A1 | 2/2020 | Mukherjee et al. | |
| 2020/0065381 A1 | 2/2020 | Chui et al. | |
| 2020/0265184 A1* | 8/2020 | Kargiannakis | G06F 40/30 |
| 2020/0327189 A1 | 10/2020 | Li et al. | |
| 2021/0397793 A1* | 12/2021 | Li | G06F 40/166 |
| 2022/0121879 A1* | 4/2022 | Goyal | G06V 30/18057 |
| 2023/0259713 A1 | 8/2023 | Religa et al. | |

OTHER PUBLICATIONS

Toshevska et al. "A Review of Text Style Transfer using Deep Learning". arXiv:2109.15144v1 [cs.CL] Sep. 30, 2021 (Year: 2021).*

"Non Final Office Action Issued in U.S. Appl. No. 16/904,037", Mailed Date: Sep. 22, 2022, 14 Pages.

"Rewrite in Word—Say it another way!", Retrieved From: https://web.archive.org/web/20200509072724/https://blog-insider.office.com/2019/08/12/rewrite-in-word-say-it-another-way/, Aug. 12, 2019, 4 Pages.

"Use the Format Painter", Retrieved from: https://web.archive.org/web/20220410105955/https://support.microsoft.com/en-us/office/use-the-format-painter-4bb415a9-d4e4-42b7-b579-170adc594e40, Apr. 10, 2022, 2 Pages.

"Final Office Action Issued in U.S. Appl. No. 16/904,037", Mailed Date: Oct. 22, 2021, 11 Pages.

"Final Office Action Issued in U.S. Appl. No. 16/904,037", Mailed Date: Jul. 11, 2022, 13 Pages.

"Non Final Office Action Issued in U.S. Appl. No. 16/904,037", Mailed Date: Mar. 2, 2022, 11 Pages.

"Non Final Office Action Issued In U.S. Appl. No. 16/904,037", Mailed Date: Jun. 28, 2021, 9 Pages.

Fu, et al., "Style Transfer in Text: Exploration and Evaluation", In Repository of arXiv:1711.06861v2, Nov. 27, 2017, 9 Pages.

Lambert, Joan, "Microsoft Word 2019 Step by Step", In Publication of Microsoft Press, Feb. 4, 2019, 24 Pages.

"International Search Report and Written Opinion Issued in PCT Application No. PCT/US21/029263", Mailed Date: Jul. 28, 2021, 12 Pages.

"International Search Report and Written Opinion Issued in PCT Application No. PCT/US22/048338", Mailed Date: Feb. 23, 2023, 12 Pages.

U.S. Appl. No. 17/583,909, filed Jan. 25, 2022.

"International Search Report and Written Opinion Issued in PCT Application No. PCT/US23/027568", Mailed Date: Nov. 2, 2023, 10 Pages.

Non-Final Office Action mailed on Feb. 23, 2024, in U.S. Appl. No. 17/583,909, 12 pages.

Notice of Allowance mailed on Jul. 17, 2024, in U.S. Appl. No. 17/583,909, 15 pages.

* cited by examiner

AUTOMATIC WRITING STYLE DETECTION AND REWRITING

BACKGROUND

There are numerous writing styles. A writing style is a combination of features of language composition that become characteristic of a particular writer, a particular genre, a particular organization, or a particular profession. The writing style of a particular individual may be distinctive for various reasons, such as but not limited to themes that appear in the individual's writing, personal idiosyncrasies of phrasing and/or idiolect. A writer's style can change depending on the type of writing they are doing, who they are writing for, and their target audience. However, an individual may be proficient in numerous writing styles but rarely, if ever, in all writing styles. Extreme examples of different 'writing styles' include writing in different languages, or different dialects of a language. But more commonly, style differences involve modification of the tone of the writing.

In many instances, a writer may be proficient in one or more writing styles but would like to author a document that has a writing style in which the writer is not proficient. For instance, a screen writer proficient in drafting scripts may struggle with writing a legal document because they are not proficient in legal writing. In other instances, multiple authors may contribute to a document, and each writer may have their own unique writing style. However, the authors prefer that the document to have a single coherent writing style. Currently, the only solution to this problem is for authors to try their best to mimic the writing style of source content, but this approach is typically ineffective. Hence, there is a need for improved systems and methods that provide a technical solution for automated detection of writing style of source content and rewriting text according to the style of the source content.

SUMMARY

An example data processing system according to the disclosure may include a processor and a machine-readable medium storing executable instructions. The instructions when executed cause the processor to perform operations including obtaining source textual content that is associated with a first writing style; obtaining target textual content that is associated with a second writing style that is different from the first writing style; providing the source textual content as an input to a first machine learning model configured to determine a writing style of textual content provided as the input; analyzing the source textual content with a first machine learning model to obtain an indication of the writing style of the source textual content; providing the indication of the writing style of the source textual content and the target textual content as an input to a second machine learning model trained to analyze the target textual content and to rewrite the target textual content according to the writing style represented by the indication; and analyzing the source indication of the writing style of the source textual content and the target textual content using the second machine learning model to obtain updated target textual content that has been rewritten according to the first writing style.

An example method implemented in a data processing system for automatically applying a writing style to textual content includes obtaining source textual content that is associated with a first writing style; obtaining target textual content that is associated with a second writing style that is different from the first writing style; providing the source textual content as an input to a first machine learning model configured to determine a writing style of textual content provided as the input; analyzing the source textual content with a first machine learning model to obtain an indication of the writing style of the source textual content; providing the indication of the writing style of the source textual content and the target textual content as an input to a second machine learning model trained to analyze the target textual content and to rewrite the target textual content according to the writing style represented by the indication; and analyzing the source indication of the writing style of the source textual content and the target textual content using the second machine learning model to obtain updated target textual content that has been rewritten according to the first writing style.

An example machine-readable medium on which are stored instructions according to the disclosure includes instructions, which when executed, cause a processor of a programmable device to perform operations of obtaining source textual content that is associated with a first writing style; obtaining target textual content that is associated with a second writing style that is different from the first writing style; providing the source textual content as an input to a first machine learning model configured to determine a writing style of textual content provided as the input; analyzing the source textual content with a first machine learning model to obtain an indication of the writing style of the source textual content; providing the indication of the writing style of the source textual content and the target textual content as an input to a second machine learning model trained to analyze the target textual content and to rewrite the target textual content according to the writing style represented by the indication; and analyzing the source indication of the writing style of the source textual content and the target textual content using the second machine learning model to obtain updated target textual content that has been rewritten according to the first writing style.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
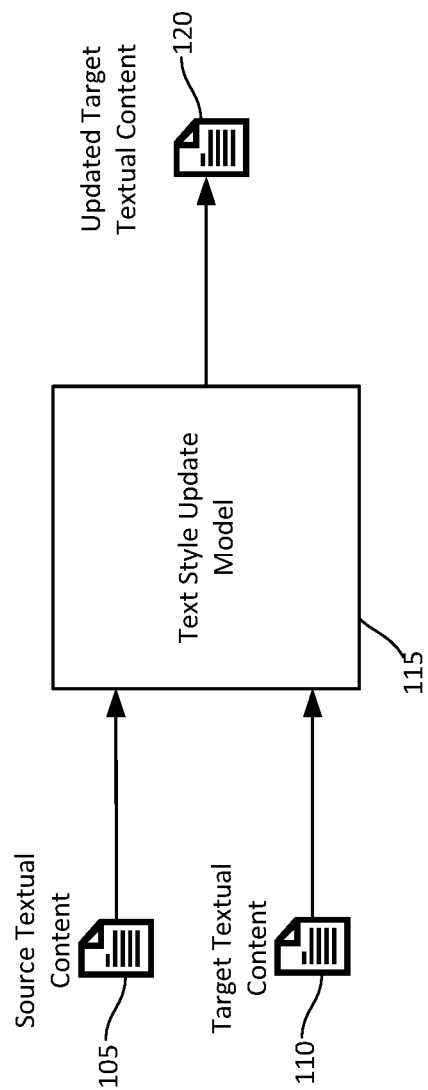
FIG. 1A is a diagram showing an example text update style model which implements the techniques disclosed herein.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for automated detection of writing style of source textual content and rewriting textual target content according to the style of the source content are provided that produce a technical solution to the problem of automatically revising textual content according to a particular writing style. The techniques are implemented using a machine learning model trained to receive source textual content and a target textual input as an input, determine a writing style of the source textual content, apply the writing style of the source textual content to the target textual input, and output an updated target textual content that has been rewritten according to the writing style of the source textual content. These techniques may be applied in a collaborative writing environment in which multiple writers contribute to portions of the document by automatically revising this content to have a consistent writing style throughout the document or to automatically update the writing style of a document having a single author to mimic the writing style of another source document. A user may select a source writing style to apply to the textual content of the document. In some implementations, the source writing style to be automatically applied across the document may be selected based on a paragraph or other segment of the document. In other implementations, the source writing style may be selected from another source document. In yet other implementations, the source writing style may be selected from a set of stored source writing styles that have been previously drafted and can be selected as the source writing style.

A technical benefit of these techniques is that the machine learning model is pretrained on a corpus of example training data to be able to identify the writing style of source textual content and to be able to automatically modify the target textual content to mimic the writing style of the source content. As a result of this training, the machine learning model can identify the writing style of source content without having previously trained on examples of this source content. Consequently, these techniques provide a flexible approach for automatically analyzing source content and for modifying target content associated with writing styles which the machine learning model has not previously encountered. Furthermore, a technical benefit of utilizing such a pretrained model enables the machine learning model to analyze the writing style of source content and apply this writing style to target content in substantially real time. These and other technical benefits of the techniques disclosed herein will be evident from the discussion of the example implementations that follow.

FIG. 1A is a diagram showing an example text style update model 115 which may implement the techniques provided herein for analyzing performance of a machine learning model may be implemented. The text style update model 115 may be trained to receive a source textual content 105 and a target textual content 110. The text style update model 115 is configured to analyze the source textual content 105 to identify a writing style of the source textual content 105. The text style update model 115 then applies the writing style of the source textual content 105 to the target textual content 110 to generate updated target text 120. The updated target text 120 is a representation of the target textual content 110 that has been rewritten according to the writing style of the source textual content 105.

The source textual content 105 may be a paragraph or other section of document that has been written according to a first writing style. The target textual content 110 may be a paragraph or other section of the same document as the source textual content 105 or may be part of or the entirety of the textual content of another document for which the textual content is to be automatically rewritten according to the writing style associated with the source textual content 105.

Figure 1B:
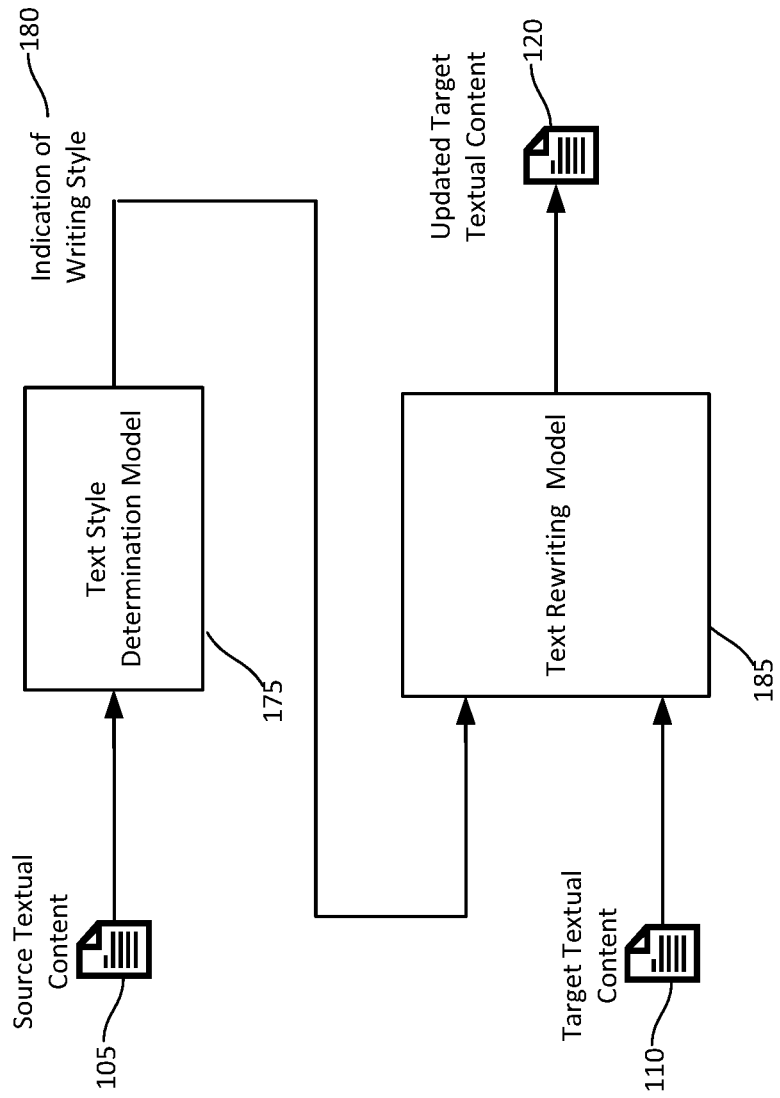
FIG. 1B is a diagram showing an alternate implementation of the text update style model shown in FIG. 1A which is implemented using multiple machine learning models to implement the techniques disclosed herein.

While the text style update model 115 shown in FIG. 1A is implemented using a single machine learning model 115, other implementations implement the functionality of the text style update model 115 using more than one model. FIG. 1B shows an alternate implementation in which the functionality of the text style update model 115 is implemented by two separate models. In the implementation shown in FIG. 1B, the source textual content 105 is provided as an input to a first machine learning model, text style determination model 175 trained to determine a writing style of the textual content provided as the input to the model. The source textual content 105 is analyzed by the text style determination model 175 to obtain an indication of the writing style 180 of the source textual content 105 (which is the first writing style in this example implementation). The indication of the writing style 180 of the source textual content 105 obtained from the first machine learning model and the target textual content 110 are provided as an input to a second machine learning model, the text rewriting model 185. The text rewriting model 185 is trained to analyze the target textual content 110 and to rewrite the target textual content 110 and output the updated target textual content 120. While many of the examples which follow refer to the text style update model 115 shown in FIG. 1A, these examples can also be implemented using a multi-model approach, such as that shown in FIG. 1B, which uses the text style determination model 175 and the text rewriting model 185.

Figure 2:
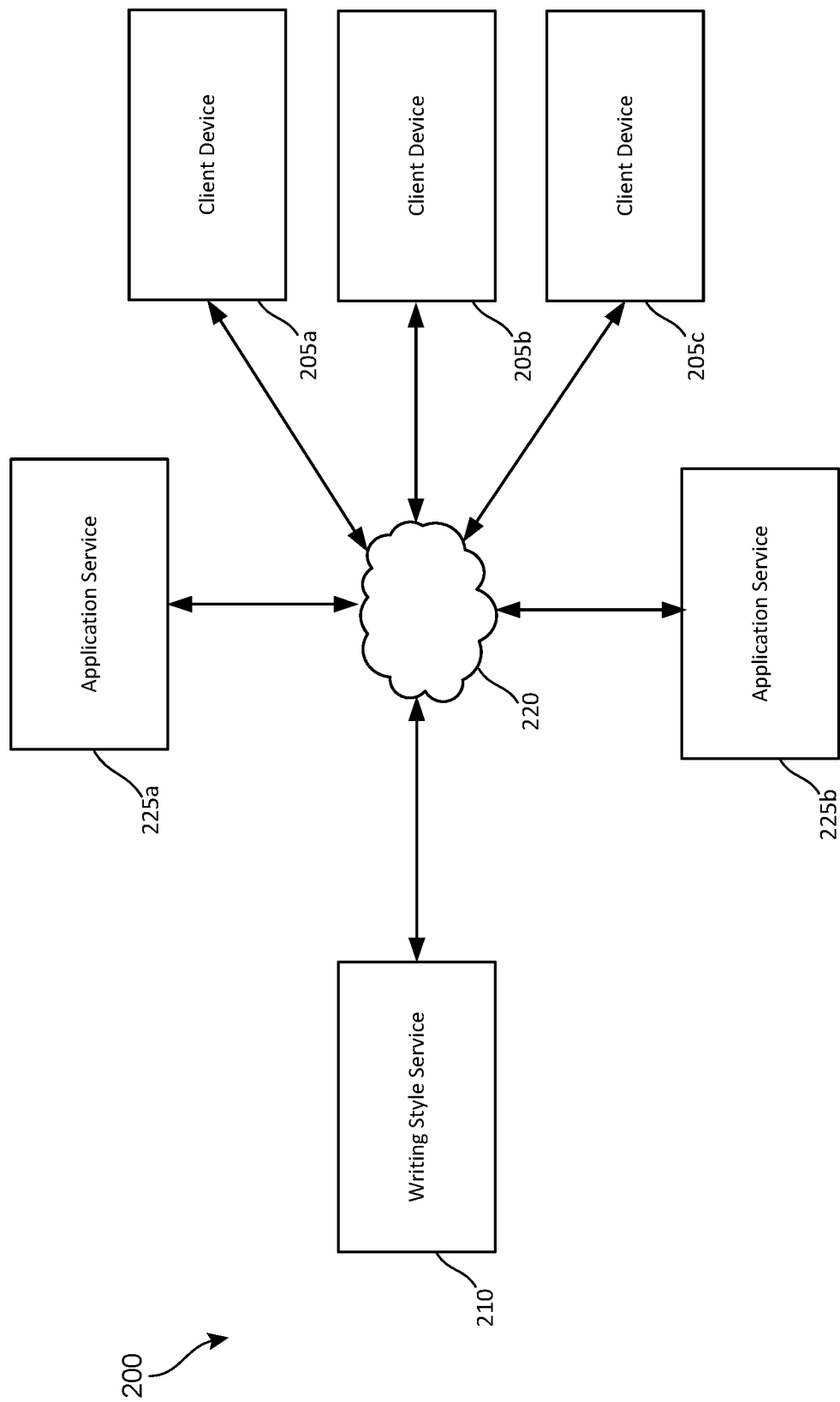
FIG. 2 is a diagram showing an example computing environment in which the techniques disclosed herein may be implemented.

FIG. 2 is a diagram showing an example computing environment 200 in which the techniques disclosed herein for automated detection of writing style of source textual content and rewriting textual target content according to the style of the source content may be implemented. The computing environment 200 may include a writing style service 210. The example computing environment 200 may also include client devices 205a, 205b, and 205c (collectively referred to as client device 205) and application services 225a and 225b (collected to referred to as application service 225). The client devices 205a, 205b, and 205c may communicate with the writing style service 210 and/or the application service 225 via the network 220. Furthermore, the application services 225a and 225b may communication with the writing style service 210 via the network 220. The network 220 may be a combination of one or more public and/or private networks and may be implemented at least in part by the Internet.

In the example shown in FIG. 2, the writing style service 210 is implemented as a cloud-based service or set of services. The writing style service 210 is configured to receive a request from a client device or application service 225 to rewrite a target textual content, such as the target textual content 110, according to a writing style of a source textual content, such as the source textual content 105. The writing style service implements the text style update model 115 shown in FIG. 1A, and/or the text style determination model 175 and the text rewriting model 185 shown in FIG. 1B. The writing style service 210 provides an updated version of the target textual content, such as the updated target textual content 120, to the client device 205 or application service 225 that sent the request to the writing style service 210. The source textual content 105 and the target textual content 110 may be structured or unstructured textual content. The structured textual content may include an electronic document that include textual content. The term "electronic document" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, presentations, websites (e.g., Microsoft SharePoint® sites), digital drawings, media files, components thereof, and the like that include a textual component that may be analyzed to determine a writing style of the textual content and/or to update the writing style of the textual content. In some implementations, the writing style service 210, or at least a portion of the functionality thereof, may be implemented by the application services 225a and 225b to provide content recommendations for users of the application services. In other implementations, the writing style service 210, or at least a portion of the functionality thereof, may be implemented by a native application on the client devices 205a, 205b, and 205c.

The application services 225a and 225b may provide cloud-based software and services that are accessible to users via the client devices 205a, 205b, and 205c. The application services 225a and 225b may include various types of applications, such as but not limited to a communications platform and/or collaboration platform, a word processing application, a presentation design application, and/or other types of applications. The application services 225a and 225b may provide functionality for users to consume, create, share, collaborate on, and/or modify various types of electronic content, such as but not limited to textual content, presentation content, web-based content, forms and/or other structured electronic content, and other types of electronic content that includes textual content for which the writing style of the textual content may be automatically modified to a specified writing style. The application services 225a and 225b may provide functionality for users to collaborate on the creation of the electronic content. The application services 225a and 225b may also provide a communication platform for users to communicate via email, text messages, audio and/or video streams as part of a communication session.

The application services 225a and 225b and/or the client devices 205a, 205b, and 205c (collectively referred to herein as "remote applications") may submit requests for updated target textual content 120 to the writing style service 210, based on source textual content 105 and target textual content 110 as discussed with respect to FIGS. 1A and 1B. The updated target textual content 120 may be stored in a persistent datastore of the application services 225a and 225b and/or the client devices 205a, 205b, and 205c, added to an electronic document, and/or presented to a user of the client devices 205a, 205b, and 205c. The updated target textual content 120 may include just a portion of textual content that has been updated to a new writing style and the application services 225a and 225b and/or the client devices 205a, 205b, and 205c may update an electronic document with the updated target textual content 120. In some implementations, the updated target textual content 120 comprises the enter electronic document, and the writing style service 210 returns an updated version of the electronic document in response to the request. The example implementations which follow demonstrate how the updated target textual content 120 may be determined by the writing style service 210.

The client devices 205a, 205b, and 205c are each a computing device that may be implemented as a portable electronic device, such as a mobile phone, a tablet computer, a laptop computer, a portable digital assistant device, a portable game console, and/or other such devices. The client devices 205a, 205b, and 205c may also be implemented in computing devices having other form factors, such as a desktop computer, vehicle onboard computing system, a kiosk, a point-of-sale system, a video game console, and/or other types of computing devices. While the example implementation illustrated in FIG. 2 includes three client devices, other implementations may include a different number of client devices that may utilize the application service 225 and/or the writing style service 210. Furthermore, in some implementations, the application functionality provided by the application service 225 may be implemented by a native application installed on the client devices 205a, 205b, and 205c, and the client devices 205a, 205b, and 205c may communicate directly with the writing style service 210 over a network connection.

In the example shown in FIG. 2, the writing style service 210 is shown as a cloud-based service that may be accessed over a network. However, other implementations of the writing style service 210 may be achieved by the application service 225 or by the client devices 205a, 205b, and 205c. In other implementations, the functionality of the writing style service 210 and/or the application service 225 described herein may be carried out on the client devices 205a, 205b, and 205c.

Figure 3:
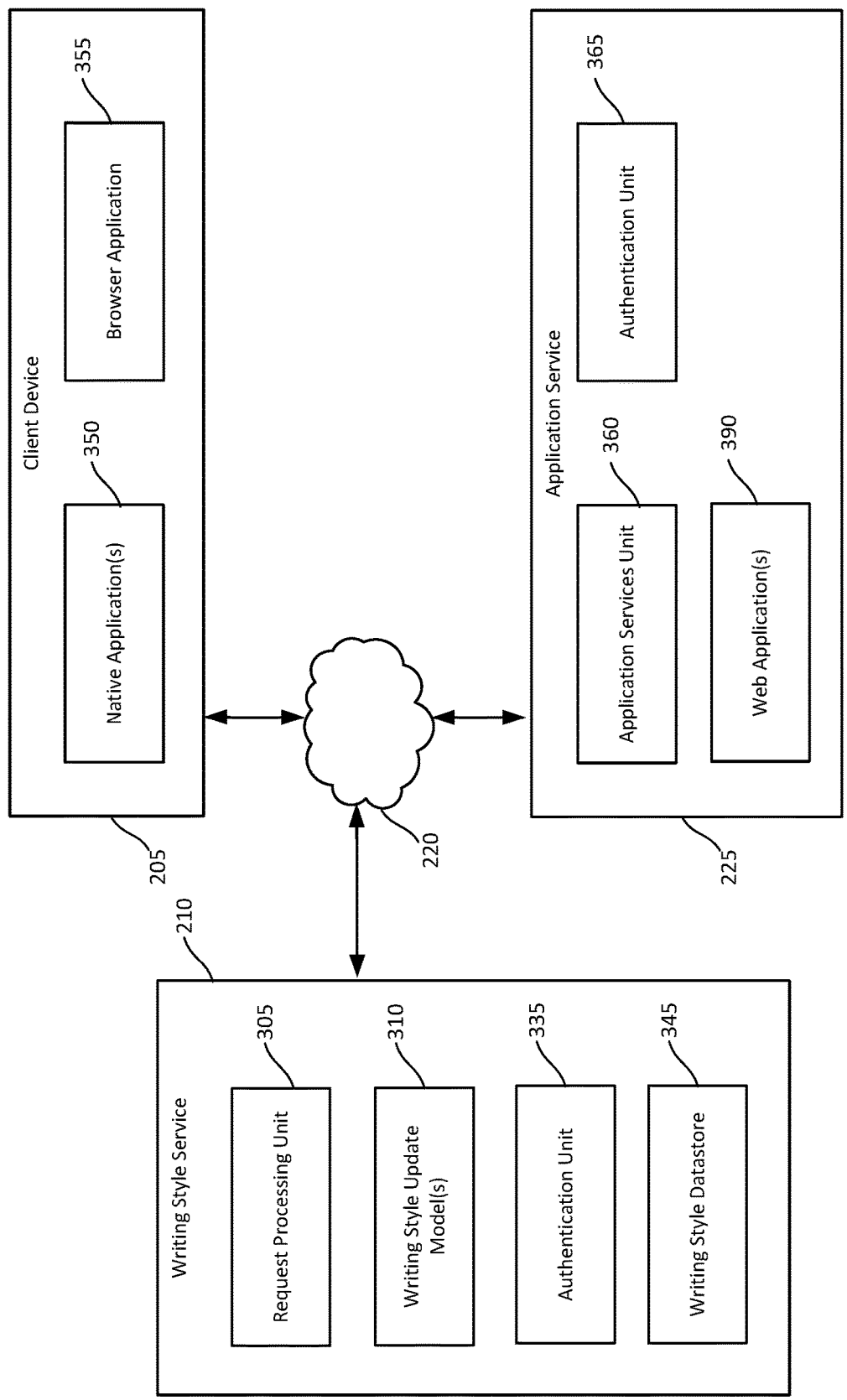
FIG. 3 shows an example architecture that may be used, at least in part, to implement the client devices, the application services, and the text style service shown in FIG. 2.

FIG. 3 is a diagram showing additional features of the writing style service 210, the client device 205, and the application service 225. The writing style service 210 may include a request processing unit 305, one or more text writing style update models 310, an authentication unit 335, and a writing style datastore 345.

The request processing unit 305 may be configured to receive requests from a client device 205 or the application service 225 to analyze source textual content 105 and to rewrite the target textual content 110 according to the writing style of the source textual content 105. The request processing unit 305 is configured to provide the source textual content 105 and the target textual content 110 as an input to the one or more text writing style update models 310. The request processing unit 305 is configured to receive the updated target textual content 120 from the one or more writing style update models 310. The request processing unit 305 provides the update target textual content 120 to the client device 205 or the application service 225 that sent the request to the writing style service 210.

The one or more writing style update models 310 comprise one or more machine learning models configured to determine a writing style of the source textual content 105 and to rewrite the target textual content 110 according to the writing style of the source textual content 105 and output the updated target textual content 120. In some implementations, a model is trained to determine the writing style of the source content 105 and to rewrite the target textual content 110 according to that writing style to produce the updated target textual content 120. In other implementations, a first machine learning model is trained to detect the writing style of the source textual content 105 and to output an indication of the writing style. In such implementations, a second machine learning model is trained to receive as inputs the indication of the writing style of the source textual content 105 output by the first machine learning model and the target textual content 110. The second machine learning model outputs the updated textual content 120. In some implementations, a first model may be trained to detect the writing style of the source textual content 105 and a second machine learning model is trained to determine the writing style of the source content 105 and to rewrite the target textual content 110 according to that writing style to produce the updated target textual content 120. In such implementations, the first machine learning model may be used to determine the writing style or writing styles used in a document, and the second machine learning model may be used to apply a writing style from source textual content 105 to a document.

The one or more writing style update models 310 can be implemented using various types of natural language processing (NLP) models. In some implementations, the model or models may be implemented using pretrained language models (PLMs). PLMs are NLP models that have been pretrained on a large-scale unsupervised corpus of training data. This enables the PLMs 405 to understand natural language accurately and to express content in human language fluently, both of which are important abilities for fulfilling text generation tasks. Bidirectional Encoder Representations from Transformers (BERT) or the OpenAI Generative Pretrained Transformer (GPT) language models are examples of two of the PLMs that may be used to implement the one or more writing style update models 310. Some implementations utilize InstructGPT, which may provide better performance than the GPT-3 language models. Other PLMs may be used in addition to or instead of these PLMs to implement the one or more writing style models 310.

The training of the one or more writing style update models 310 may be fine-tuned using training data for detecting a writing style of source textual content, such as the source textual content 105 and for rewriting target textual content, such as the target textual content 110. In some implementations, the NLP model or models may be distilled once trained to generate a smaller version of the model or models that provide similar results to the originally trained model or models but may require significantly less memory and computing resources to support implement an instance of the model. Distillation may be used in implementations in which the model or models are to be deployed to a computing environment that has limited memory and or computing resources, such as the client device 205.

The writing style datastore 345 is a persistent datastore that is used by the writing style service 210 to store writing style information. The writing style datastore 345 may be used to store information about a writing style that may be used to apply that writing style to target textual content. The writing style information may include a representation of a particular datastore that has been generated by a model of the one or more writing style update models 310. For example, the writing style information may include embedding information that provides a representation of the writing style that may be used by a model of the one or more writing style update models 310 to apply that writing style to target textual content. In some implementations, the writing style information may be a numerical vector that represents characteristics of the of writing style. This approach allows the writing style service 210 to store writing styles automatically and/or in response to user requests to enable users to later apply these writing styles to target textual content.

The authentication unit 335 may provide functionality for verifying whether users are permitted to access the services and/or documents provided by the writing style service 210. The authentication unit 335 may provide functionality for receiving authentication credentials for the users from their respective client device 205 and/or from the application service 225. The authentication unit 335 may be configured to verify that the authentication credentials are valid and permit the users to access the services provided by the writing style service 210 responsive to the authentication credentials being valid.

The application service 225 may include an application services unit 360 and/or an authentication unit 365. The application services unit 360 may be configured to provide functionality for users to consume, create, share, collaborate on, and/or modify various types of electronic content. The application services unit 360 may provide a web-based interface to enable users to access at least a portion of the services provided by the application service 225. In other implementations, users may access the services provided by the application service 225 via one or more native applications 350. The application services unit 360 may in turn obtain the services provided by the writing style service 210.

The authentication unit 365 may provide functionality for verifying whether users are permitted to access the services and/or documents provided by the application service 225 and/or the writing style service 210. The authentication unit 365 may provide functionality for receiving authentication credentials for the users from their respective client device 205. The authentication unit 365 may be configured to verify that the authentication credentials are valid and permit the users to access the services and/or documents provided by the application service 225 and/or the writing style service 210 responsive to the authentication credentials being valid.

The client device 205 may include one or more native applications 350 and/or a browser application 355. The one or more native applications 350 may include an application developed for use on the client device 205 and/or an application that may communicate with the application services 225a and 225b to enable users to consume, create, share, collaborate on, and/or modify electronic content. The browser application 355 may be an application for accessing and viewing web-based content. The application services 225a and 225b may provide a web application 390 that enables users to consume, create, share, collaborate on, and/or modify content. A user of the client device 205 may access the web application 390 via the browser application 335 and the browser application renders a user interface for interacting with the application services 225a and 225b in the browser application 355. The application services 225a and 225b and/or the writing style service 210 may support both the one or more web-enabled native applications 350 and one or more web applications 290, and the users may choose which approach best suits their needs. The writing style service 210 may also provide support for the one or more native applications 350, the browser application 355, or both to provide functionality for a user of the client device 205 to obtain the services provided by the writing style service 210.

Figure 4A:
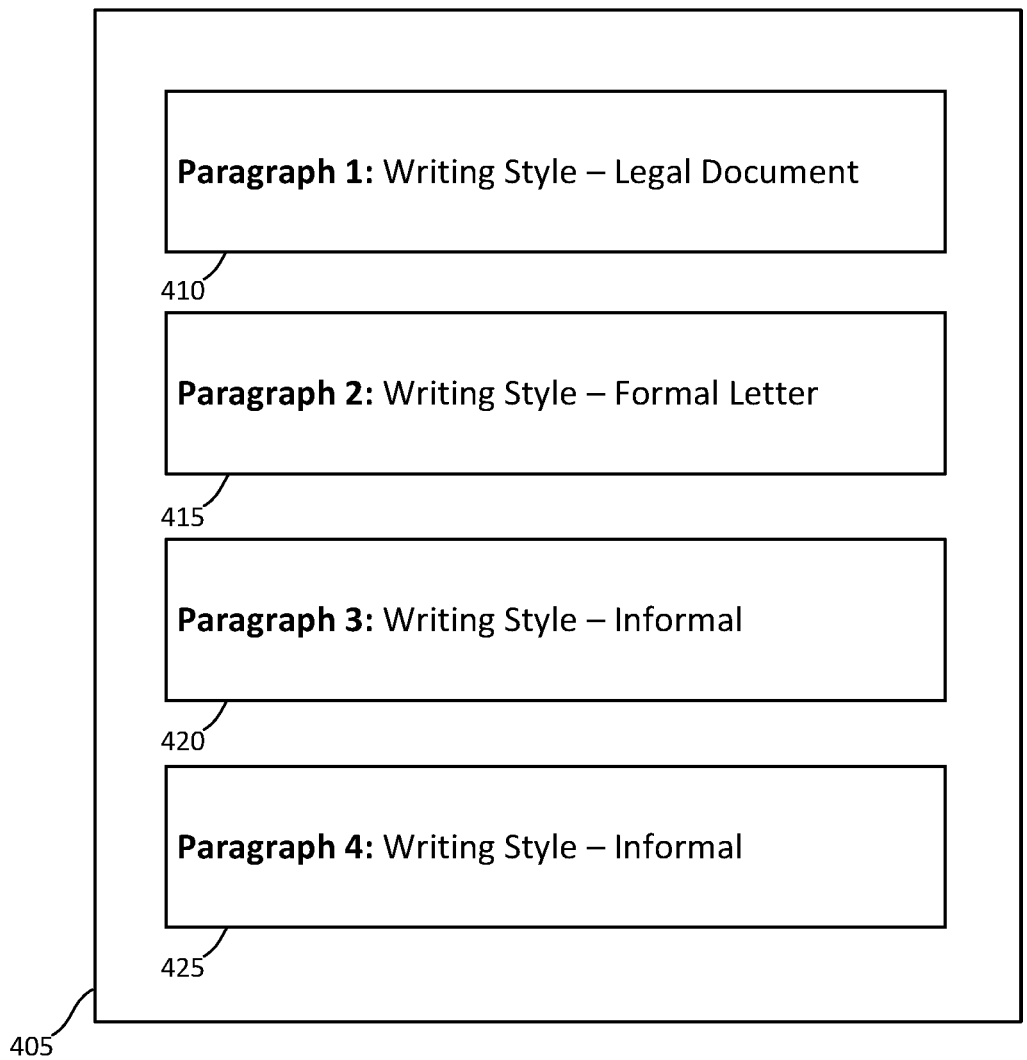
FIGS. 4A and 4B are diagrams that show examples of a document that includes multiple paragraphs and applying a writing style associated with a source paragraph to other paragraphs of the document.
Figure 4B:
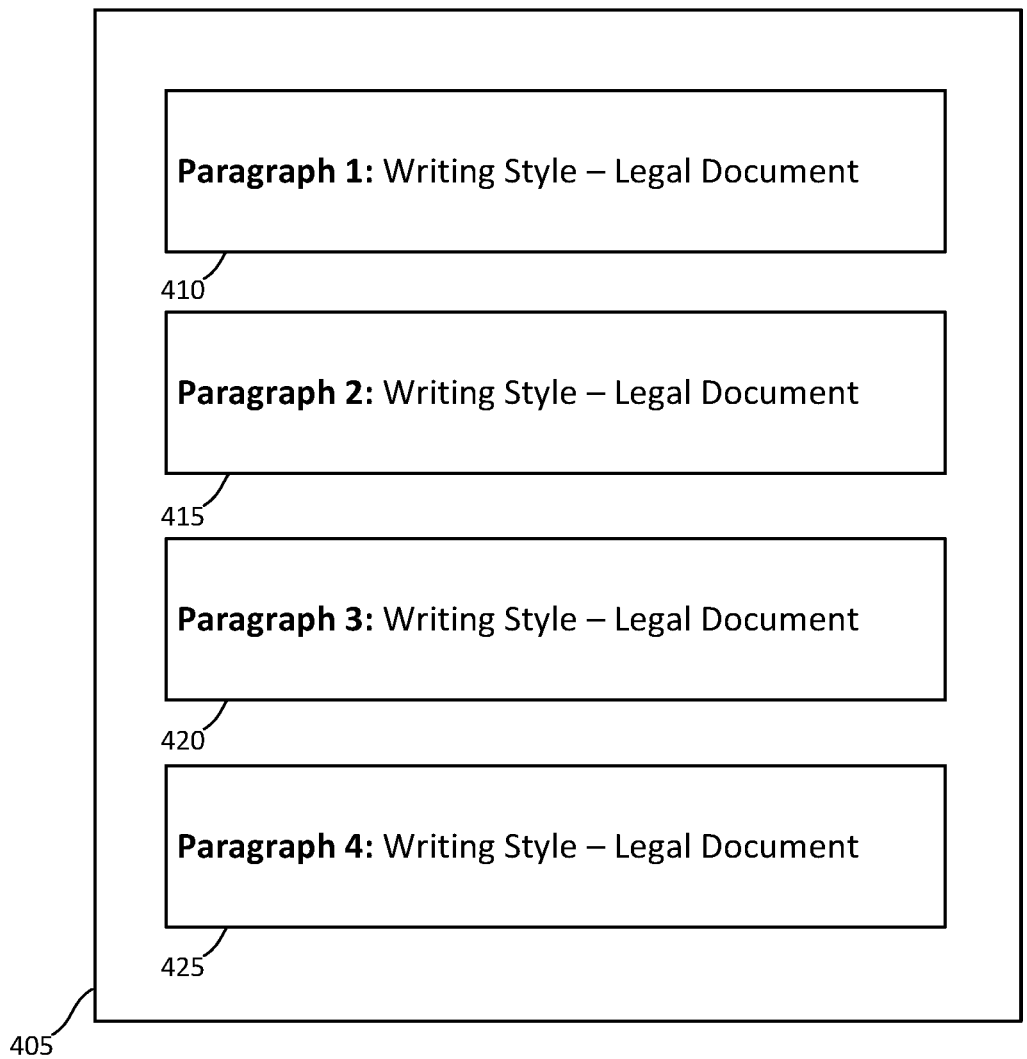

FIGS. 4A and 4B are diagrams that show examples of a document 405 that includes multiple paragraphs 410, 415, 420, and 425, and applying a writing style associated with a source paragraph of the document 405 to other paragraphs of the document 405. FIG. 4A shows the document 405 in a first state in which the document 405 includes paragraphs having various writing styles. In this example, the first paragraph 410 the first paragraph is written in the style of a legal document, the second paragraph 415 is written according to the writing style of a formal letter, and the third and fourth paragraphs 420 and 425 are written according to an informal writing style. Each of the paragraphs 410, 415, 420, and 425 have been associated with a writing style to illustrate the techniques provided herein but have not yet been analyzed by a model of the one or more writing style update models 310 to determine the writing style associated with each of the paragraphs. Furthermore, the example writing styles shown in this example are non-limiting and implementation of the techniques provided herein may utilize writing styles in addition to and/or instead of the example writing styles shown in this example.

The document 405 may be a collaborative document where multiple users have contributed paragraphs to the document, and each of the paragraphs reflect a writing style of that user. In other instances, the document 405 may represent a document that has been assembled using paragraphs from different example documents or templates and have been customized by the user for the document being authored. In either situation, the writing style of the paragraphs throughout the document does not match, which can negatively impact the readability of the document.

FIG. 4B shows an example of the document 405 in which the user has selected a writing style to be applied to the entire document. In this example, the user selected the first paragraph 410 as the source textual content 105 and the remaining paragraphs of the document as the target textual content 110. The writing style of the paragraphs 415, 420, and 425 have been updated to the legal writing style. In this example, the user selected the first paragraph 410 as the source textual content 105 and the paragraphs 415, 420, and 425 as the target textual content 110. However, the user may alternatively have selected the writing style of one of the other paragraphs of the document to be applied to all or a subset of the paragraphs of the document.

In some implementations, the web application 390 of the application service 225 and/or the native application 350 are configured to provide a user interface that includes elements that enable the user to select a source paragraph from which the writing style will be applied to one or more target paragraphs of the document 405. In other implementations, the web application 390 and/or the native application 350 are configured to prompt the user whether to apply the writing style of the preceding text of a document to paragraph or other section of text that has been pasted into the document 405. In other implementations, the web application 390 and/or the native application 350 are configured to prompt the user whether the user would like to apply the writing style of a paragraph or other section of text that has been pasted into the document 405 to the rest of the document. In some implementations, the web application 390 and/or the native application 350 may analyze each paragraph or other section of the document automatically as the user is creating or modifying the document 405 to determine the writing style of each paragraph or other section of the document 405 and prompt the user if the document 405 has inconsistent writing styles throughout the document. The web application 390 and/or the native application 350 may provide the document 405 to the writing style service 210 for analysis, and the writing style service 210 may analyze each paragraph or other section of the document 405 and provide an indication to the web application 390 and/or the native application 350 whether the writing systems are consistent throughout the document 405. The web application 390 and/or the native application 350 may guide the user through selecting a source writing style to apply throughout the document 405 and/or to selected portions of the document 405. In some implementations, the web application 390 and/or the native application 350 may provide a user interface that enables the user to select a different document to serve as the source textual content 105 from which the writing style is to be applied to the document 405. Some implementations may support more than one of these approaches for applying a writing style a document.

Figure 5A:
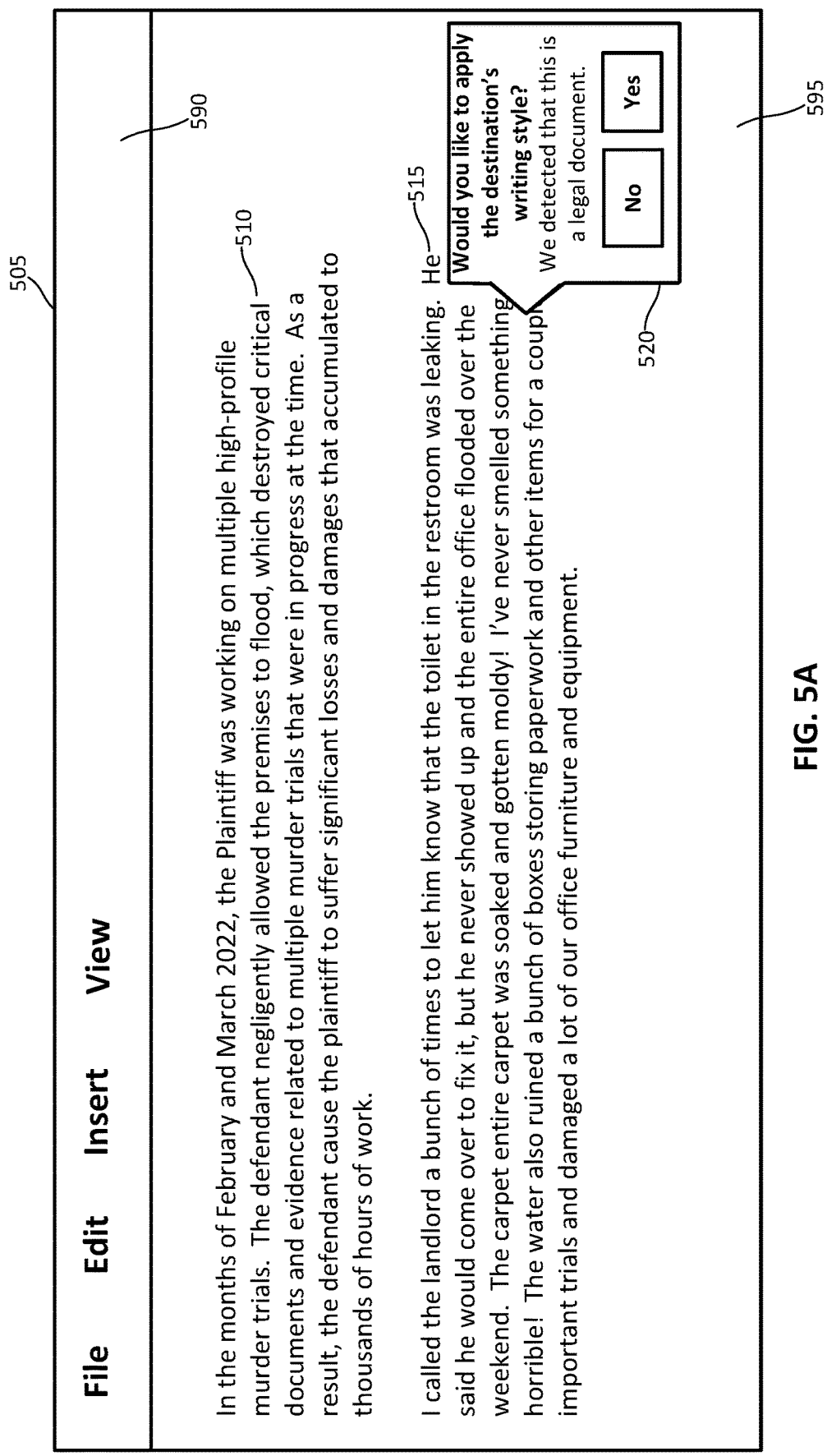
FIGS. 5A, 5B, and 5C are diagrams of an example user interface that demonstrates how the techniques for automatically detecting the writing style of source content and applying that writing style to target content may be implemented in an example word processing application.
Figure 5B:
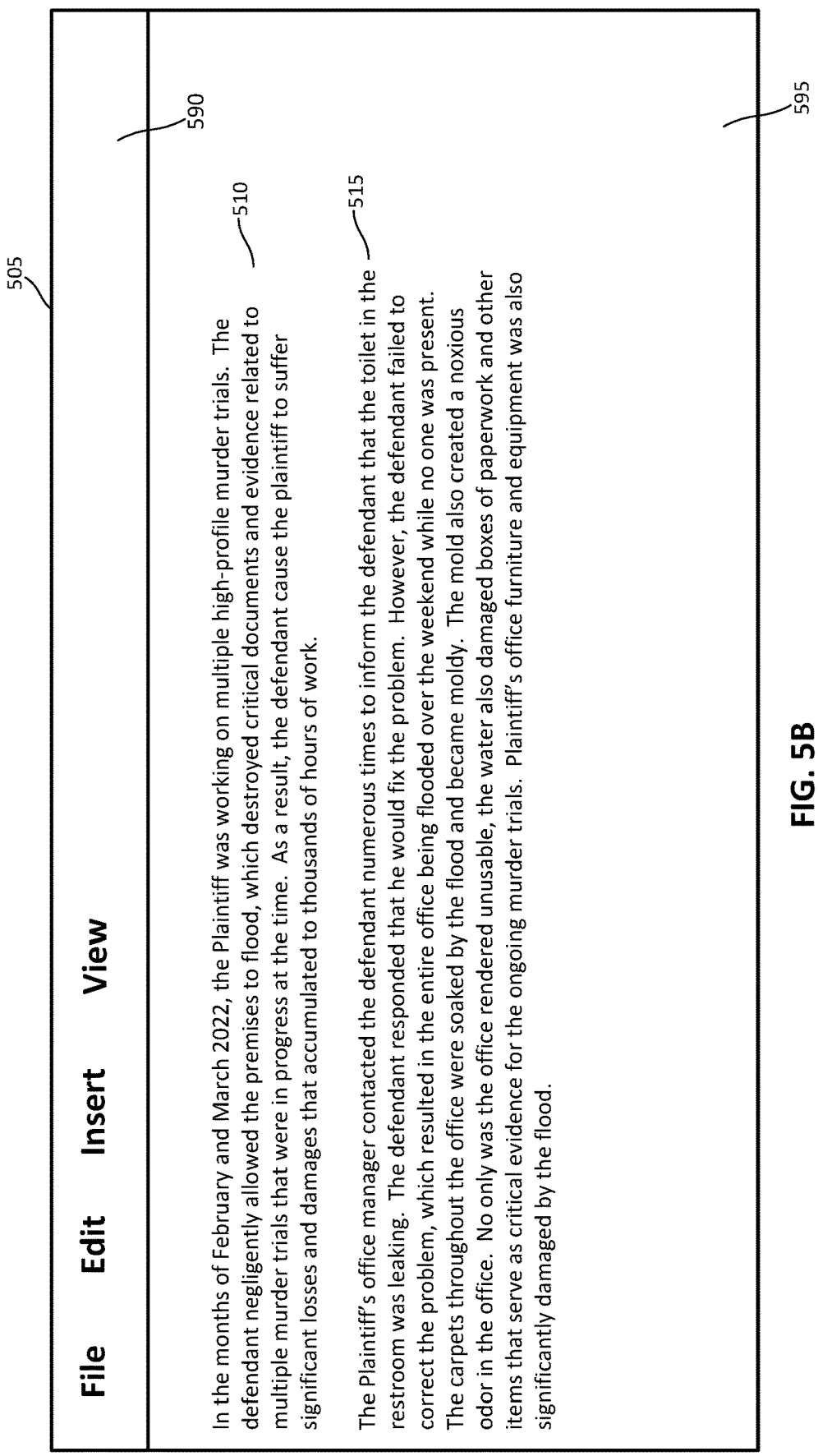
Figure 5C:
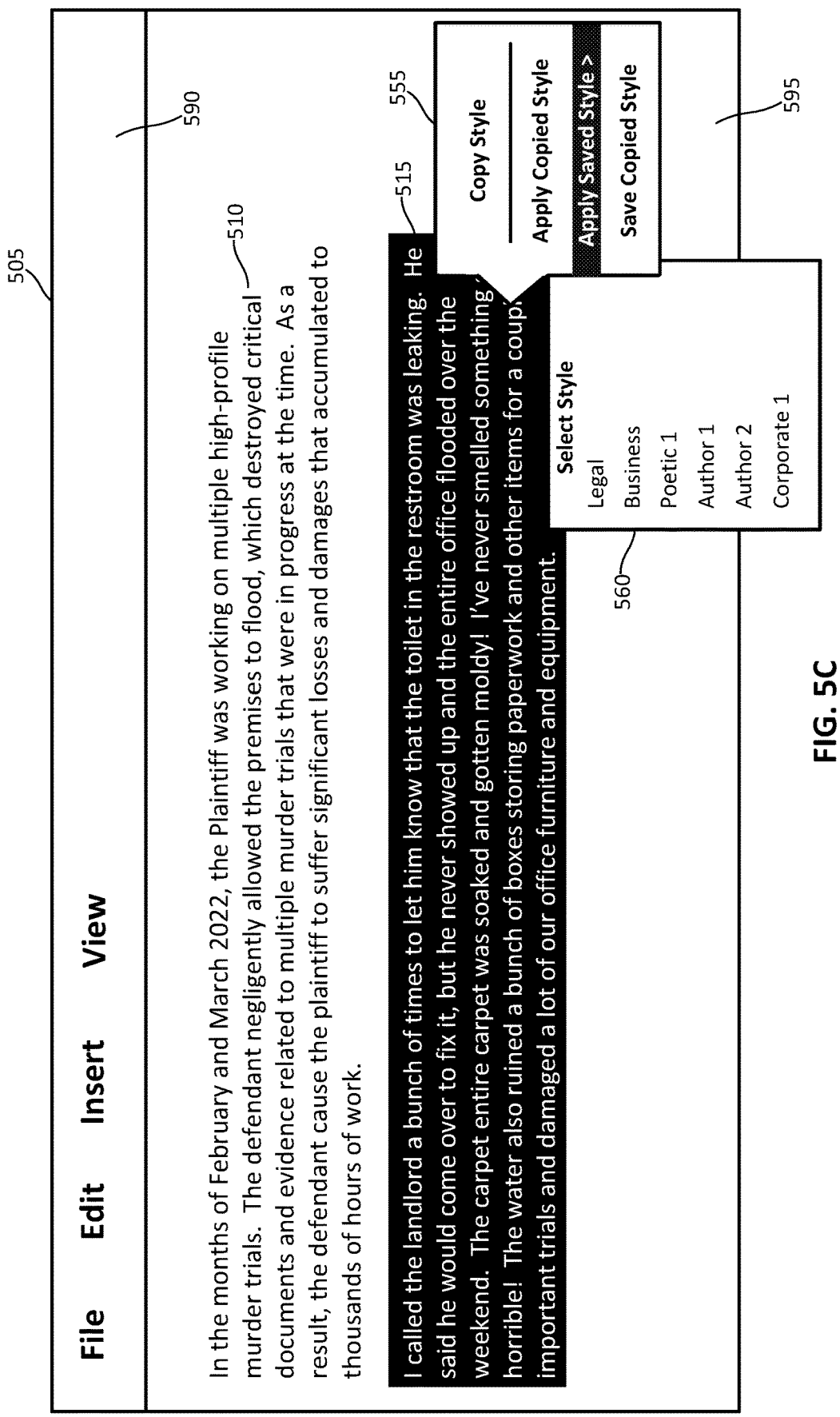

FIGS. 5A, 5B, and 5C are diagrams of an example user interface that demonstrates how the techniques for automatically detecting the writing style of source content and applying that writing style to target content may be implemented in an example word processing application. FIGS. 5A, 5B, and 5C show a non-limiting example user interface 505 of a word processing program. The techniques provided herein may be utilized with other types of applications in which the users may create, collaborate on, and/or modify textual content. The user interface includes a menu bar 190 and a content pane 595. The menu bar 590 provides access to various functionality of the word processing program, and the content pane 595 displays a document that is being created, collaborated on, or modified by a user. The user interface 505 may be presented on a display of the client device 205, for example, by the web application 390 and/or the native application 350.

In the example shown in FIG. 5A, the document includes a first paragraph 510 and a second paragraph 515. In this example, the first paragraph 510 has been authored by a first user and is associated with a legal document writing style, and the second paragraph 515 has been authored by a second user and is associated with an informal writing style. The document may be a collaborative document that is being contributed to by both the first and second users, or either the first user or the second user may have created the document and pasted in content provided by the second user. In the example shown in FIG. 5A, the latter situation is shown in which the first user has pasted the second paragraph 515 into the document. The web application 390 and/or the native application 350 send a request to the paragraph 515 to the writing style service 210 to obtain an indication of the writing style associated with the second paragraph 515. The web application 390 and/or the native application 350 compares the writing style associated with the second paragraph 515 with the writing style of the first paragraph 510 and determines that the writing style of the newly added paragraph differs from that of the first paragraph 510. In response, the web application 390 and/or the native application 350 may display a prompt, such as the prompt 520, to the user indicating that a mismatch in writing styles has been detected and asking the user if they would like to apply the writing style of the first paragraph 510 to the second paragraph 515. In a multi-paragraph document, the writing style of the preceding paragraphs may have already been modified to have a consistent writing style and the writing style of the document as a whole may be considered. The user has the option to decline to update the writing style of the second paragraph 515. The user also has the option to accept the automatic updating of the writing style of the second paragraph 515.

In some implementations, the web application 390 and/or the native application 350 send the first paragraph 510 as the source textual content 105 and the second paragraph 515 as the target textual content 110 to the writing style service 210 in order to obtain an updated target textual content 120 that represents a version of the second paragraph 515 that has been rewritten according to the writing style of the first paragraph. FIG. 5B shows an example of the second paragraph 515 having been updated in response to such a request. In some implementations, the web application 390 and/or the native application 350 send an indication of the writing style of the first textual content to the writing style service 210 instead of the first paragraph 510 where the writing style of the first paragraph 510 has already been determined. This approach reduces the amount of network traffic required to support the techniques provided herein by only sending the source content 105 as required. Furthermore, this approach can reduce the computational and/or memory resources required by the writing style service 210 to handle the request, because the writing style of the source textual content 105 has already been determined.

FIG. 5C shows another example of the user interface 595 in which the user may save a writing style and/or apply a previously saved writing style to a document. In this example, the user interface 505 includes a writing style menu 555 from which the user may copy a writing style of a selected paragraph or other portion of the document, select a writing style to be applied to the selected paragraph or other section of the document shown in the content pane 595 as a whole or to a specific paragraph or other section of the document, save a writing style, and/or apply a saved writing style. The saved styles menu 560 shows a list of examples of some saved writing styles. Other implementations may include other writing styles instead of or in addition to the examples shown in FIG. 5C. These writing styles may be stored in the writing style datastore 345 of the writing service 210. The web application 390 and/or the native application 350 may query the writing style datastore 345 to obtain a list of the available writing styles. In some implementations, the user may be presented with user-specific writing styles that have been created by the user or which the user is permitted to access. For example, the user may be part of an organization or enterprise that has organization-specific or enterprise-specific writing styles that have been predefined, and the user may access and apply these writing styles to textual content.

In some implementations, the user interface 505 may prompt the user to provide input whether to apply the style to the document as a whole or to a currently selected paragraph or other section of the document. In some implementations, the currently selected paragraph or other sections of the document may have been highlighted in advance of selecting the style from the style selection menu 560. The selected style may also be applied to a paragraph or other section of the document in which a cursor or other positional indicator is position.

To save a writing style of a selected paragraph, the user may select the "save copied style" option from the menu shown in FIG. 5C instead of the "apply copied style" option. If the writing style of the selected paragraph has already been determined, an indication of the writing style may be provided to the writing style service 210 to store the writing style along with a name and/or description of the writing style. If the writing style has not yet been determined, the selected paragraph is provided as the source textual content 105 to the writing style service 210 along with the name and/or description of the writing style. The user interface 505 may also provide means for the user to define which users may access and apply the writing style. The writing style service 210 stores the writing style in the writing style datastore 345.

Figure 6:
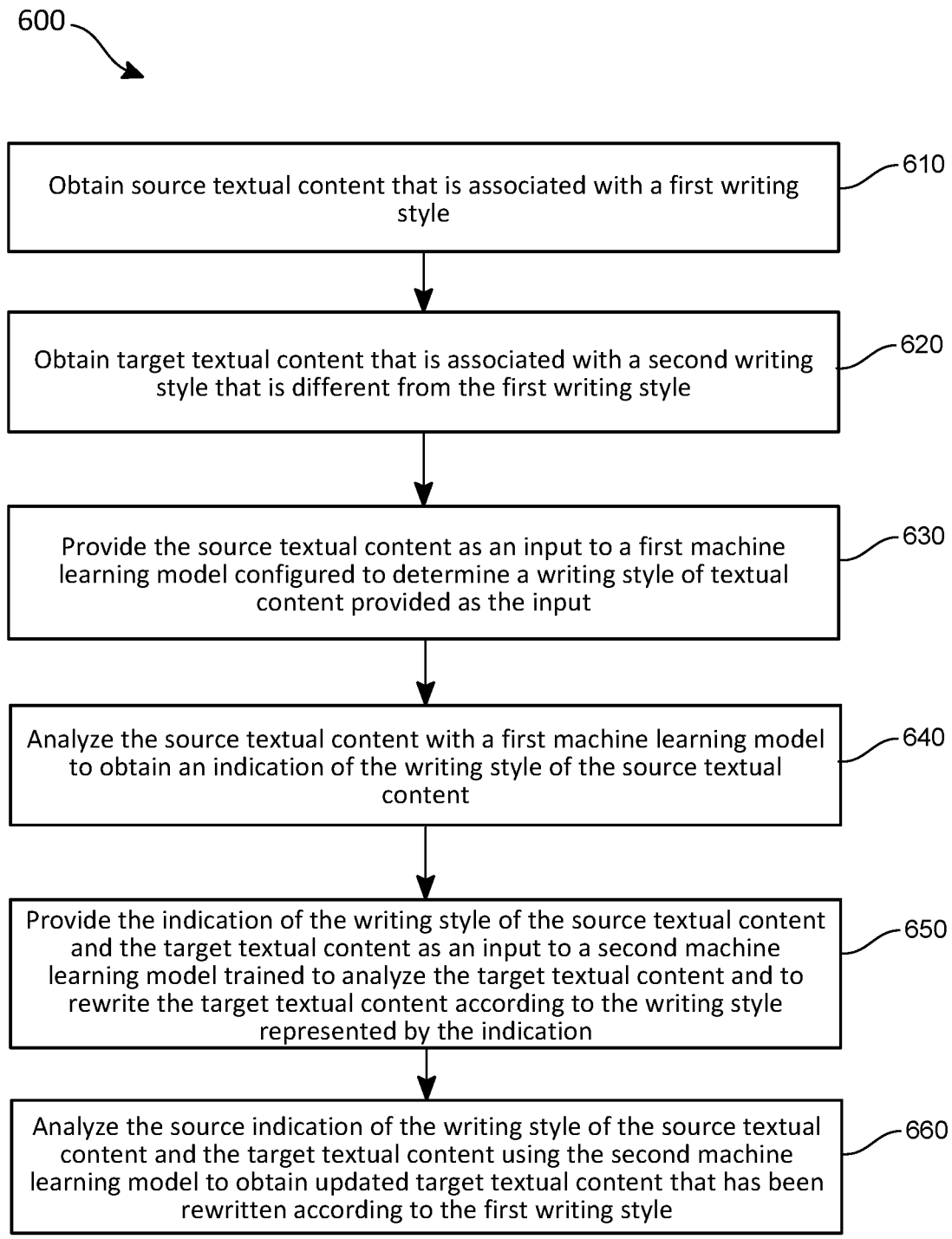
FIG. 6 is a flow diagram of a process for automatically detecting a writing style of source content and applying the writing style to target content according to the techniques provided herein.

FIG. 6 is an example flow chart of an example process 600 for applying a writing style to textual content. The process 600 includes an operation 610 of obtaining source textual content that is associated with a first writing style and an operation 620 of obtaining target textual content that is associated with a second writing style that is different from the first writing style. The source textual content 105 and the target textual content 110 may be obtained from the web application 390 of the application service 225 and/or the native application 350 as discussed in the preceding examples.

The process 600 includes an operation 630 of providing the source textual content as an input to a first machine learning model, such as the text style determination model 175, trained to determine a writing style of textual content provided as the input, and an operation 640 of analyzing the source textual content with a first machine learning model to obtain an indication 180 of the writing style of the source textual content 105. The first machine learning model is an NLP model that is trained to analyze the source textual content 105 and to generate a representation of the writing system of the source textual content 105.

The process 600 includes an operation 650 of providing the indication of the writing style of the source textual content and the target textual content as an input to a second machine learning model, such as the text rewriting model 185, trained to analyze the target textual content and to rewrite the target textual content according to the writing style represented by the indication. The second machine learning model is an NLP that is configured to analyze and to understand the target textual content 110 and to rewrite the target textual content 110 according to the first writing style of the source textual content 105.

The process 600 includes an operation 660 of analyzing the source indication of the writing style of the source textual content and the target textual content using the second machine learning model to obtain updated target textual content 120 that has been rewritten according to the first writing style. As discussed in the preceding examples, the functionality of the first machine learning model and the second machine learning model discussed in this example may be implemented as a single machine learning model that is configured to analyze the source textual content 105 to determine the first writing style of the source textual content 105 and to rewrite the target textual content 110 according to the first writing style.

While the example implementation shown in FIG. 6 includes a first and second machine learning model, other implementations include a single machine learning model that is configured to perform the operations 630-660 using a single machine learning model configured to receive both the source textual content and the target textual content as inputs and output the updated target textual content that has been rewritten according to the first writing style of the source textual content. Such an implementation is shown in FIG. 1A, which is discussed in detail in the preceding examples.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
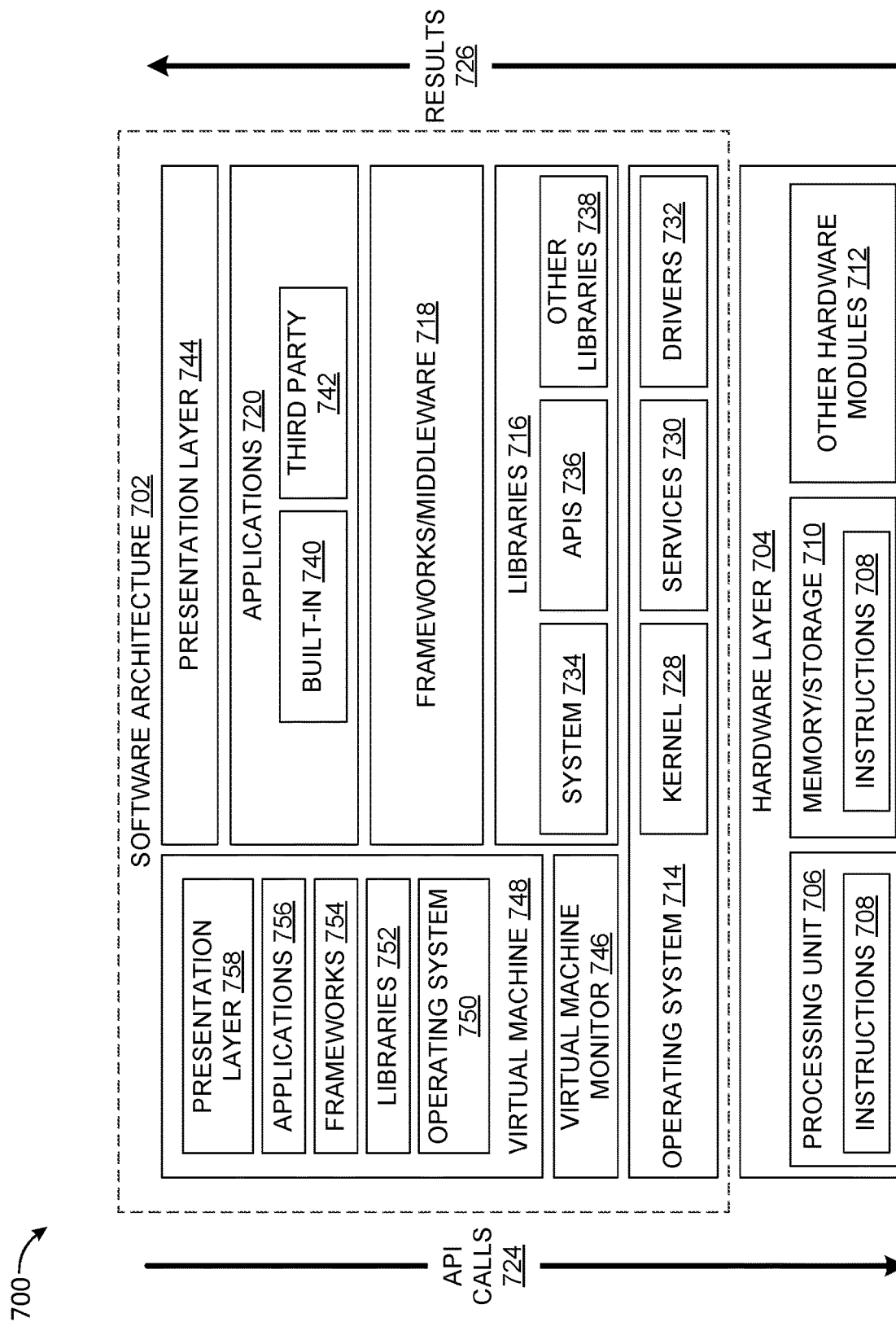
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 607 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
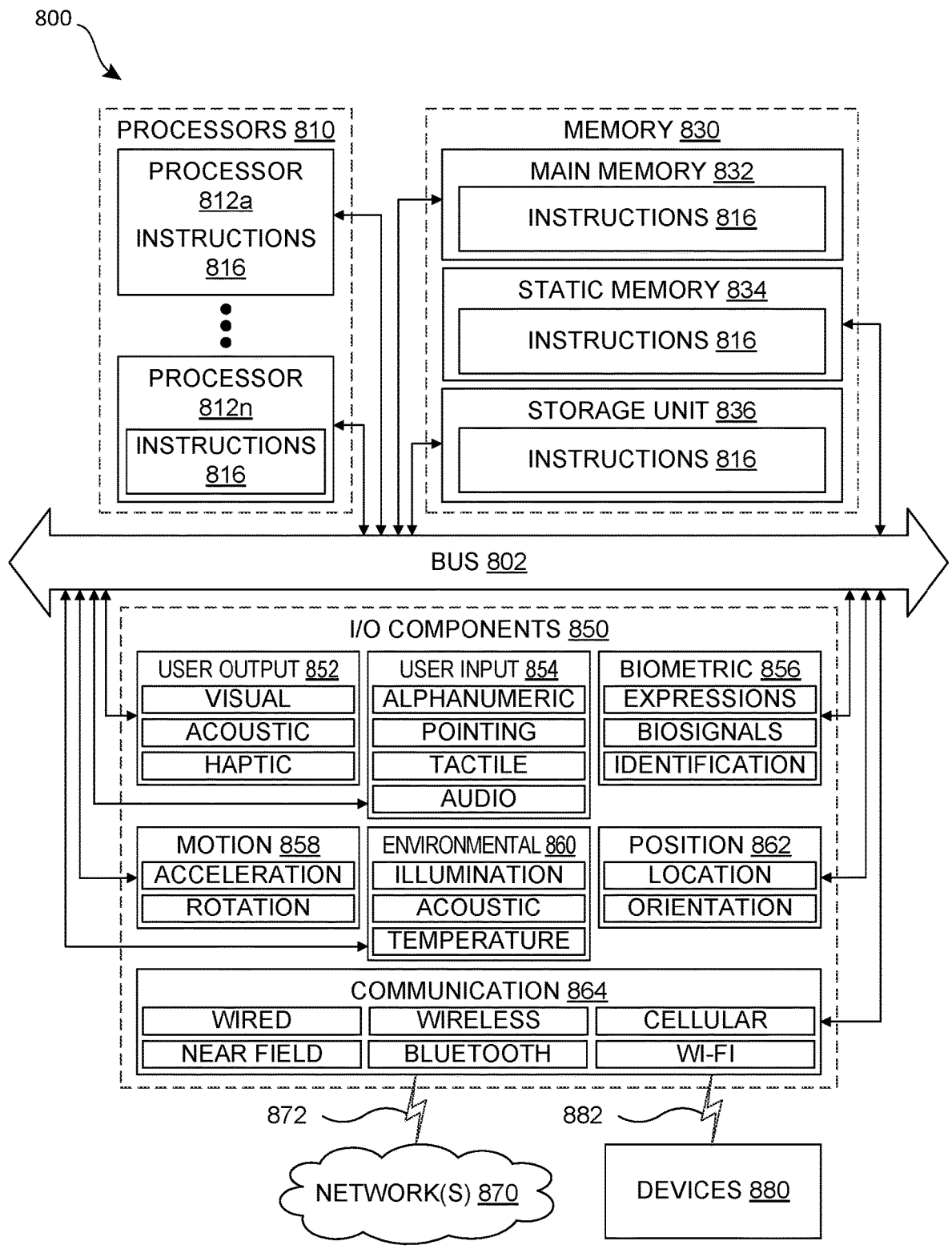
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations comprising:
obtaining source textual content that is associated with a first writing style;
obtaining first target textual content that is associated with a second writing style that is different from the first writing style;
providing the source textual content as an input to a first machine learning model trained to determine a writing style of textual content provided as the input;
analyzing the source textual content using the first machine learning model to obtain an indication of the writing style of the source textual content;
providing the indication of the writing style of the source textual content and the first target textual content as an input to a second machine learning model trained to analyze the first target textual content and to rewrite the first target textual content according to the writing style represented by the indication that was obtained from the first machine learning model;
analyzing the indication of the writing style of the source textual content and the first target textual content using the second machine learning model to obtain updated first target textual content that has been rewritten according to the first writing style;
storing writing style information for the first writing style in a writing style datastore;
obtaining a second target textual content that is associated with a third writing style;
receiving a request to apply the first writing style to the second target textual content;
retrieving the writing style information for the first writing style from the writing style datastore;
providing the writing style information for the first writing style and the second target textual content as an input to the second machine learning model; and
analyzing the writing style information for the first writing style and the second target textual content using the second machine learning model to obtain updated second target textual content that has been rewritten according to the first writing style.

2. The data processing system of claim 1, wherein the first machine learning model and the second machine learning model are a single machine learning model configured to receive the source textual content and the first target textual content, to determine the writing style of the source textual content, and to rewrite the first target textual content according to the writing style of the source textual content.

3. The data processing system of claim 1, wherein the machine-readable storage medium includes instructions configured to cause the processor to perform operations of:
receiving a request to store writing style information for a third writing style in a writing style datastore, the writing style information including information that can be used by the second machine learning model to rewrite a respective target textual content according to the third writing style.

4. The data processing system of claim 3, wherein the machine-readable storage medium includes instructions configured to cause the processor to perform operations of:
receiving a request to apply the third writing style to second target textual content;
accessing the writing style information for the third writing style from the writing style datastore;
providing the writing style information for the third writing style and the second target textual content as an input to the second machine learning model; and
analyzing the writing style information for the third writing style and the second target textual content using the second machine learning model to obtain updated second target textual content that has been rewritten according to the third writing style.

5. The data processing system of claim 1, wherein the machine-readable storage medium includes instructions configured to cause the processor to perform operations of:
receiving a request to analyze a first document comprising a plurality of paragraphs of textual content from a first remote application;
analyzing each paragraph of the first document using the first machine learning model to determine a respective writing style associated with each paragraph;
determining whether the first document is associated with a consistent writing style by comparing respective writing styles of the plurality of paragraphs of the textual content; and
providing an indication to the first remote application indicating whether the first document is associated with a consistent writing style.

6. The data processing system of claim 1, wherein the source textual content and the first target textual content are portions of a same document, and wherein the second machine learning model is configured to update the writing style of all of the same document according to the first writing style.

7. The data processing system of claim 1, wherein the first machine learning model, the second machine learning model, or both, are implemented using transformer-like model, GPT3, or InstructGPT.

8. A method implemented in a data processing system automatically updating a writing style of textual content, the method comprising:
obtaining source textual content that is associated with a first writing style;
obtaining first target textual content that is associated with a second writing style that is different from the first writing style;
providing the source textual content as an input to a first machine learning model trained to determine a writing style of textual content provided as the input;
analyzing the source textual content using the first machine learning model to obtain an indication of the writing style of the source textual content;
providing the indication of the writing style of the source textual content and the first target textual content as an input to a second machine learning model trained to analyze the first target textual content and to rewrite the first target textual content according to the writing style represented by the indication that was obtained from the first machine learning model;
analyzing the indication of the writing style of the source textual content and the first target textual content using the second machine learning model to obtain updated first target textual content that has been rewritten according to the first writing style;
storing writing style information for the first writing style in a writing style datastore;
obtaining a second target textual content that is associated with a third writing style;
receiving a request to apply the first writing style to the second target textual content;
retrieving the writing style information for the first writing style from the writing style datastore;
providing the writing style information for the first writing style and the second target textual content as an input to the second machine learning model; and
analyzing the writing style information for the first writing style and the second target textual content using the second machine learning model to obtain updated second target textual content that has been rewritten according to the first writing style.

9. The method of claim 8, wherein the first machine learning model and the second machine learning model are a single machine learning model configured to receive the source textual content and the first target textual content, to determine the writing style of the source textual content, and to rewrite the first target textual content according to the writing style of the source textual content.

10. The method of claim 8, further comprising:
receiving a request to store writing style information for a third writing style in a writing style datastore, the writing style information including information that can be used by the second machine learning model to rewrite a respective target textual content according to the third writing style.

11. The method of claim 10, further comprising:
receiving a request to apply the third writing style to second target textual content;
accessing the writing style information for the third writing style from the writing style datastore;
providing the writing style information for the third writing style and the second target textual content as an input to the second machine learning model; and
analyzing the writing style information for the third writing style and the second target textual content using the second machine learning model to obtain updated second target textual content that has been rewritten according to the third writing style.

12. The method of claim 8, further comprising:
receiving a request to analyze a first document comprising a plurality of paragraphs of textual content from a first remote application;
analyzing each paragraph of the first document using the first machine learning model to determine a respective writing style associated with each paragraph;
determining whether the first document is associated with a consistent writing style by comparing respective writing styles of the plurality of paragraphs of the textual content; and providing an indication to the first remote application indicating whether the first document is associated with a consistent writing style.

13. The method of claim 8, wherein the source textual content and the first target textual content are portions of a same document, and wherein the second machine learning model is configured to update the writing style of all of the same document according to the first writing style.

14. The method of claim 8, wherein the first machine learning model, the second machine learning model, or both, are implemented using a transformer-like model, GPT3, or InstructGPT.

15. A machine-readable medium on which are stored instructions that, when executed, cause a processor of a programmable device to perform operations of:
    obtaining source textual content that is associated with a first writing style;
    obtaining first target textual content that is associated with a second writing style that is different from the first writing style;
    providing the source textual content as an input to a first machine learning model trained to determine a writing style of textual content provided as the input;
    analyzing the source textual content using the first machine learning model to obtain an indication of the writing style of the source textual content;
    providing the indication of the writing style of the source textual content and the first target textual content as an input to a second machine learning model trained to analyze the first target textual content and to rewrite the first target textual content according to the writing style represented by the indication that was obtained from the first machine learning model;
    analyzing the indication of the writing style of the source textual content and the first target textual content using the second machine learning model to obtain updated first target textual content that has been rewritten according to the first writing style;
    storing writing style information for the first writing style in a writing style datastore;
    obtaining a second target textual content that is associated with a third writing style;
    receiving a request to apply the first writing style to the second target textual content;
    retrieving the writing style information for the first writing style from the writing style datastore;
    providing the writing style information for the first writing style and the second target textual content as an input to the second machine learning model; and
    analyzing the writing style information for the first writing style and the second target textual content using the second machine learning model to obtain updated second target textual content that has been rewritten according to the first writing style.

16. The machine-readable medium of claim 15, wherein the first machine learning model and the second machine learning model are a single machine learning model configured to receive the source textual content and the first target textual content, to determine the writing style of the source textual content, and to rewrite the first target textual content according to the writing style of the source textual content.

17. The machine-readable medium of claim 15, further comprising instructions configured to cause the processor to perform operations of:
    receiving a request to store writing style information for a third writing style in a writing style datastore, the writing style information including information that can be used by the second machine learning model to rewrite a respective target textual content according to the third writing style.

18. The machine-readable medium of claim 17, further comprising instructions configured to cause the processor to perform operations of:
    receiving a request to apply the third writing style to second target textual content;
    accessing the writing style information for the third writing style from the writing style datastore;
    providing the writing style information for the third writing style and the second target textual content as an input to the second machine learning model; and
    analyzing the writing style information for the third writing style and the second target textual content using the second machine learning model to obtain updated second target textual content that has been rewritten according to the third writing style.

19. The machine-readable medium of claim 15, further comprising instructions configured to cause the processor to perform operations of:
    receiving a request to analyze a first document comprising a plurality of paragraphs of textual content from a first remote application;
    analyzing each paragraph of the first document using the first machine learning model to determine a respective writing style associated with each paragraph;
    determining whether the first document is associated with a consistent writing style by comparing respective writing styles of the plurality of paragraphs of the textual content; and
    providing an indication to the first remote application indicating whether the first document is associated with a consistent writing style.

20. The machine-readable medium of claim 15, wherein the source textual content and the first target textual content are portions of a same document, and wherein the second machine learning model is configured to update the writing style of all of the same document according to the first writing style.

* * * * *